United States Patent [19]

Aoyama

[11] Patent Number: 4,995,112
[45] Date of Patent: Feb. 19, 1991

[54] SECURITY SYSTEM

[75] Inventor: Mitsunobu Aoyama, Oome, Japan

[73] Assignee: Kabushiki Kaisha Toshiba, Kawasaki, Japan

[21] Appl. No.: 374,067

[22] Filed: Jun. 30, 1989

[30] Foreign Application Priority Data

Jul. 5, 1988 [JP] Japan .................. 63-167605

[51] Int. Cl.⁵ .............................................. H04K 1/00
[52] U.S. Cl. .................................. 380/25; 364/242.95
[58] Field of Search .................. 380/4, 25; 364/242.95

[56] References Cited

U.S. PATENT DOCUMENTS

| | | | |
|---|---|---|---|
| 4,652,698 | 3/1987 | Hale et al. | 380/25 |
| 4,891,838 | 1/1990 | Faber | 380/25 |
| 4,897,874 | 1/1990 | Lidinsky et al. | 380/25 |

Primary Examiner—Thomas H. Tarcza
Assistant Examiner—David Cain
Attorney, Agent, or Firm—Finnegan, Henderson, Farabow, Garrett, and Dunner

[57] ABSTRACT

In a distributed processing system having a plurality of nodes, a correspondence table, which represents a correspondence between the nodes and corresponding passwords that grant access to the nodes, stored in a disk device. Each of the nodes includes a passthrough device which permits passthrough of access request data to a node of the next hierarchical level. Upon receipt of access request data, the passthrough device refers to the correspondence table to check a password contained in the received access request data for validity of access to the node. When the password is valid, the passthrough of the access request data is permitted.

9 Claims, 3 Drawing Sheets

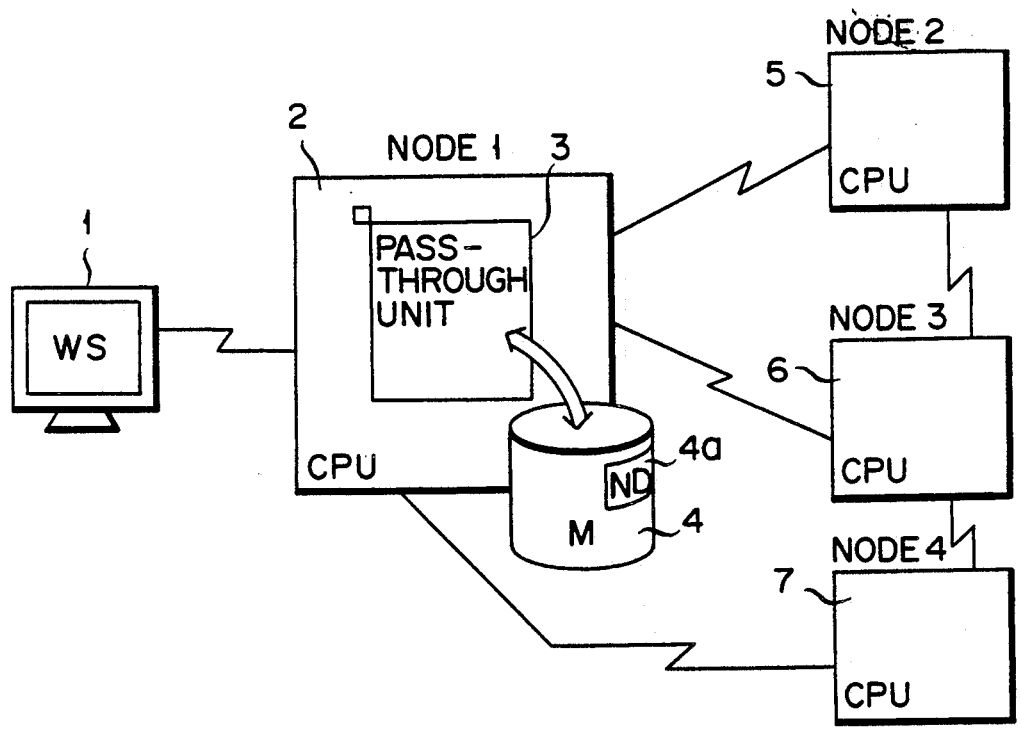
F I G. 3
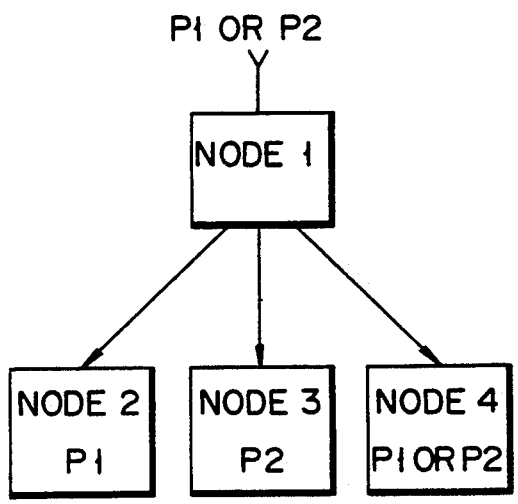
F I G. 4
| NODE NAME | PASSWORD |
|---|---|
| NODE 1 | P1 OR P2 |
| NODE 2 | P1 |
| NODE 3 | P2 |
| NODE 4 | P1 OR P2 |
F I G. 5

SECURITY SYSTEM

BACKGROUND OF THE INVENTION

1. Field of the Invention

The present invention relates to a security system and method for use in a distributed processing system. More specifically, the invention relates to a security system and method for checking passwords for validity at the time of access to nodes of more than one hierarchical levels for passthrough of access request over nodes.

2. Description of the Related Art

A security system used in a conventional network system of one-hierarchical structure is arranged as shown in FIG. 1. For example, in the case of a system wherein operator passwords are used for security, when an operator of a work station (WS) 01 logs on a CPU 02 at node 1, the password of the operator is checked for validity by an operating system (OS) of CPU 02 at node 1. The logon is a procedure for user access to a system involving identification, access control, and exchange of network information between user and system.

Such a validity checking system can realize security in one-hierarchical structure of FIG. 1.

However, a network system of two-hierarchical structure shown in FIG. 2 has a problem of no provision for security protection in the case of access over two hierarchical levels wherein the WS operator logs on CPU 02 at node 1 and moreover accesses CPU 03 at node 2 via a passthrough device in CPU 01 at node 1. That is, work station (WS) 01 thinks of itself as accessing node 1 even in the case where it actually accesses node 2. Therefore, if the password in access request data to node 1 is identified as a password stored in node 1, it is possible to gain access to node 1. In this case, however, if node 1 has not an application program specified by WS 01, node 1 would send the access request data to node 2. This means that WS 01 can access node 2 only by use of a password for access to node 1. It is theoretically possible to install a checking system in node 2 (host node). In practice, this is not practical because load on the host node increases. That is, the problem with the conventional distributed processing system is the absence of reliability of security because access request data is transferred to the next node by a passthrough device when a requested application program is not found in a node first accessed.

SUMMARY OF THE INVENTION

It is therefore an object of the present invention to provide a security system for use in a distributed processing system.

It is another object of the present invention to provide a security method for use in a distributed processing system.

According to an aspect of the present invention there is provided a security system for use in a distributed processing system having a plurality of nodes comprising: passthrough means for permitting passthrough of access request data for a node, which includes at least address information for specifying the node and security information indicating whether access to the node is valid or not; node directory storing means for storing a node directory representing a correspondence between nodes and security information indicating accessibility to each of the nodes; and means responsive to reception of access request data to a node for referring to said node directory stored in said node directory storing means on deciding that the access request data is not for self-node and for causing said passthrough means to permit passthrough of the access request data to another node when the security information in the access request data indicates accessibility to the another node.

According to another aspect of the present invention, there is provided a security method, in a distributed processing system with a plurality of nodes, of checking validity of access request data having at least address information for specifying a node to access and security information indicating whether access to the node is valid or not, comprising the steps of: preparing correspondence information representing a correspondence between the nodes and security information corresponding to the nodes; referring to the correspondence information and the security information in received access request data to check the received access request data for validity; and permitting passthrough of the received access request data when the received access request data is valid.

According to the present invention, when access is made to nodes of more than one hierarchical levels, a node directory is used to check an operator password for validity at the time of passthrough of access request data over nodes.

BRIEF DESCRIPTION OF THE DRAWINGS

FIG. 3 is a block diagram of a security system embodying the present invention;

FIG. 4 is a diagram for explaining a relationship between nodes set in a node directory and security information in the embodiment of FIG. 3;

FIG. 5 shows the contents of the directory shown in FIG. 3; and

DETAILED DESCRIPTION OF THE PREFERRED EMBODIMENT

Figure 1:
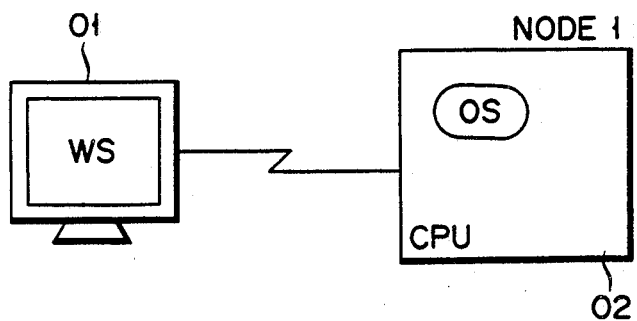
FIG. 1 is a schematic diagram for explaining a method of security in a conventional network system of one-hierarchical structure.
Figure 2:
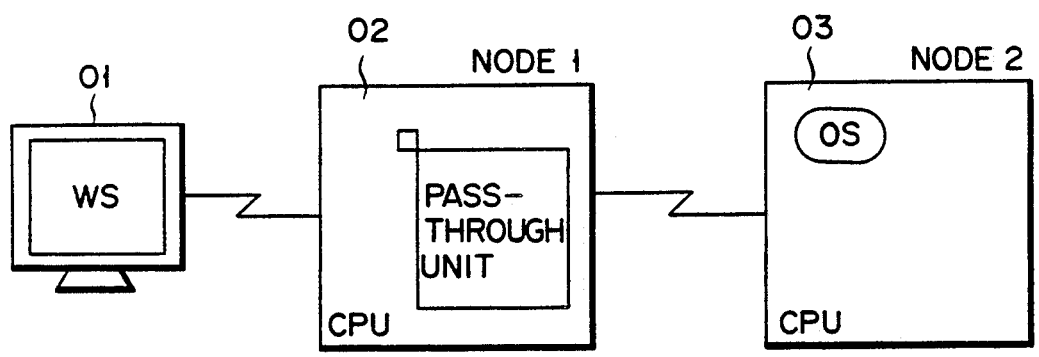
FIG. 2 is a schematic diagram for explaining a method of security in a conventional network system of multi-hierarchical structure.

Referring now to FIG. 3, a distributed processing system involving a security system embodying the invention comprises a work station (WS) 1 serving as a terminal, a distributed processor 2 serving as a subhost unit, and a plurality of CPUs 5, 6 and 7 serving as host units at nodes 2, 3 and 4. For example, the IBM 3270 model may be used as work station 1 and the IBM AS-400 model may be used as subhost unit 2. An operator enters access request data from work station 1. In this embodiment the access request data is formed of logon data, a node name and an operator password serving as security information. Subhost unit 2 is directly accessed by the operator via work station 1. In this embodiment subhost unit 2 is accessible to the operator password P1 or P2. A passthrough unit 3 is installed in subhost unit 2 to permit passthrough of the access request data to other nodes 2, 3 and 4.

An external memory device 4 is composed of magnetic storage and stores such a directory 4a as shown in FIG. 4, which establishes a correspondence between the nodes and the corresponding passwords. The contents of the directory is shown in FIG. 5. In this example, CPU 5 at node 2 is accessible to password P1, CPU 6 at node 4 to password P2, and CPU 7 at node 4 to password P1 or P2. Directory 4a is referred to by passthrough unit 3 in performing the passthrough of access request data.

Figure 6:
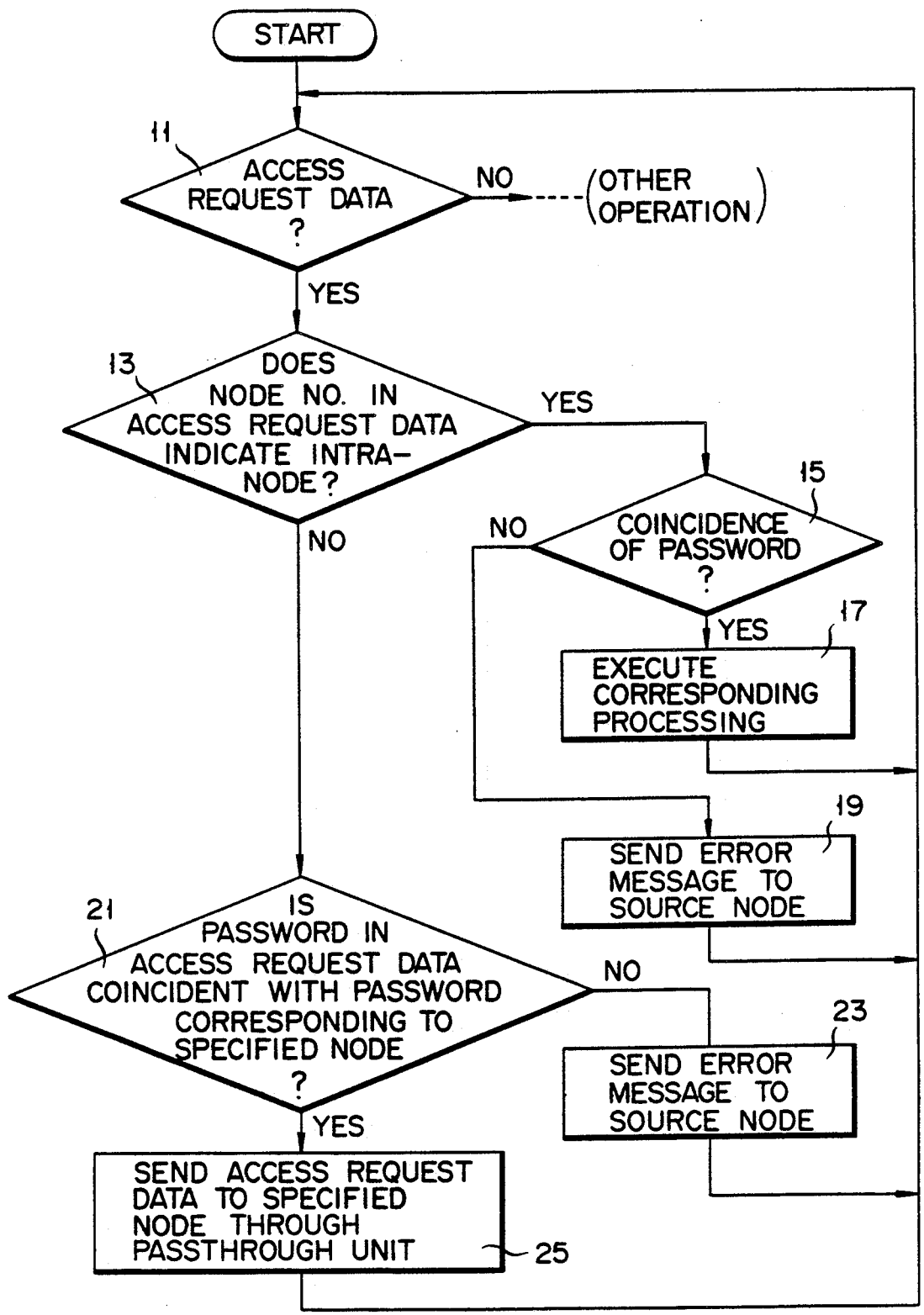
FIG. 6 is a flowchart representing the operation of the embodiment of FIG. 3.

The operation of the embodiment of the present invention will be described with reference to a flowchart of FIG. 6.

In memory device 4 accessed by CPU 2 at node 1 is previously stored information representing a correspondence between nodes and passwords (P1, P2) in the distributed processing system.

When the operator sends access request data from work Station 1 to CPU 2 at node 1, CPU 2 checks whether the received data is access request data or not in step 11. If not access request data, CPU 2 performs other operations. On the other hand, when access request is identified in step 11, CPU 2 checks whether the node No. in the access request data indicates intra-node or not in step 13. When the self-node is indicated, CPU 2 refers to node directory 4a to check whether a coincidence occurs between passwords or not in step 15. If, in this case, the password in the access request data is P1 or P2, access to CPU 2 at node 1 is allowed. When a coincidence occurs between passwords in step 15, CPU 2 executes corresponding processing in step 17. When no coincidence occurs between passwords in step 15, on the other hand, CPU 2 sends an error message to the access source node in step 17.

When the node specified by the access request data is not the intra-node in step 13, CPU 2 refers to node directory 4a to check whether the password in the access request data coincides with the password of a specified node or not in step 23. If no coincidence occurs, CPU 2 sends an error message to the access source node in step 23.

If a coincidence occurs in step 25, CPU 2 sends the access request data to the specified node via passthrough unit 3 in step 25.

Here, the password of node 2 is P1 as shown in FIG. 4. Therefore, access to CPU 5 at node 2 is allowed when the operator password entered from work station 1 is P1 but denied when the entered password is P2.

In accessing other nodes (nodes 3 and 4), the operator password is checked for validity by referring to node directory 4a as in the previous case.

Although the above embodiment has been described in terms of a distributed processing system in which a plurality of nodes have a multilevel hierarchical relationship, the nodes may have the same hierarchical level. Although passwords have been used as security information, other information, such as user identification data or authorized lists, may be employed. Moreover, although, in the above embodiment, a network system of two-hierarchical structure has been described by way of example, the present invention may be applied to a network system with more than two hierarchical levels.

What is claimed is:

1. A security system for use in a distributed processing system having a plurality of nodes, comprising:

passthrough means for passing access request data through an intra node to another one of said plurality of nodes, said access request data including at least address information for specifying one of said plurality of nodes and security information for obtaining access to one of said plurality of nodes;

node directory storing means for storing a node directory representing a correspondence between each of said plurality of nodes and respective security information; and control means for receiving said access request data, and upon determining that said address information does not specify said intra node and that said security information of said access request data corresponds to said address information in accordance with said correspondence represented by said node directory, for causing said passthrough means to pass said access request data through said intra node to said other one of said plurality of nodes.

2. The system according to claim 1, wherein said control means includes:

means for determining if said address information specifies said intra node;

means for determining if said security information of said access request data corresponds to said address information specifying said intra node in accordance with said correspondence represented by said node directory; and means for permitting access to said intra node when said address information specifies said intra node and when said security information of said access request data corresponds to said address information specifying said intra node in accordance with said correspondence represented by said node directory.

3. The system according to claim 2, further comprising means for sending an error message to a node issuing said access request data when said security information of said access request data does not correspond to said address information specifying said intra node in accordance with said correspondence represented by said node directory.

4. The system according to claim 1, wherein said control means includes:

means for determining if said security information of said access request data corresponds to said address information in accordance with said correspondence represented by said node directory; and means for sending an error message to a node issuing said access request data when said security information of said access request data does not correspond to said address information specifying said other one of said plurality of nodes in accordance with said correspondence represented by said node directory.

5. In a distributed processing system with a plurality of nodes which accesses one node through another node, a security method of checking validity of access request data having at least node data for specifying a node to access and a password indicating whether access to the node is valid or not, the security method comprising the steps of:

preparing correspondence information representing a correspondence between the node data and passwords corresponding to the nodes;

determining whether or not the password designated in the access request data coincides with a password in the correspondence information that corresponds to the node data designated in the access request data; and passing the access request data through an intra node to another node upon coincidence of the passwords.

6. The method according to claim 5, wherein said determining step includes the steps of:
   determining if the node data included in the access request data specifies the intra node;
   determining if the password included in the access request data coincides with the password of the node to be accessed when the node data included in the access request data specifies the intra node; and
   permitting access to the intra node.

7. The method according to claim 6, further comprising the steps of:
   sending an error message to a node issuing the access request data if the password included in the access request data does not coincide with the password of the node to be accessed when the node data included in the access request data specifies the intra node.

8. The method according to claim 5, wherein said determining step includes the steps of:
   determining if the password included in the access request data coincides with the password corresponding to the specified node data; and
   sending an error message to a node issuing the access request data if the password included in the access request data does not coincide with the password corresponding to the specified node data.

9. A security system in a distributed processing system wherein a plurality of nodes are arranged in a hierarchical structure of different hierarchical levels, comprising:
   a terminal serving as a source node, for issuing access request data including node specifying data for specifying a destination node to be accessed, and a password for accessing the destination node;
   a host unit which serves as the destination node;
   a subhost unit which serves as an intra node and which is connected between said terminal and said host unit, including,
      table memory means for storing a correspondence between node specifying data and passwords;
      passthrough means for passing the access request data through the intra node to a node of a different hierarchical level; and
      control means for determining whether or not the node specifying data included in the access request data specifies the intra node, for referring to said table memory means to determine whether or not the password included in the access request data coincides with a password of the destination node stored in said table memory means and whether or not the node specifying data designates a node at a higher level in the hierarchy than the intra node, and for passing the access request data to said host unit if the password included in the access request data coincides with the password of the destination node stored in said table memory means.

* * * * *